(12) United States Patent
Boucadair et al.

(10) Patent No.: US 12,081,429 B2
(45) Date of Patent: Sep. 3, 2024

(54) METHOD OF AUTOMATIC SETUP BY A FIRST DEVICE OF A SESSION COMPLYING WITH A DYNAMIC ROUTING PROTOCOL WITH A SECOND DEVICE

(71) Applicant: ORANGE, Issy-les-Moulineaux (FR)

(72) Inventors: Mohamed Boucadair, Chatillon (FR); Christian Jacquenet, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 75 days.

(21) Appl. No.: 16/767,868

(22) PCT Filed: Nov. 21, 2018

(86) PCT No.: PCT/FR2018/052935
§ 371 (c)(1),
(2) Date: May 28, 2020

(87) PCT Pub. No.: WO2019/106260
PCT Pub. Date: Jun. 6, 2019

(65) Prior Publication Data
US 2020/0374212 A1 Nov. 26, 2020

(30) Foreign Application Priority Data
Nov. 28, 2017 (FR) ...................................... 1761315

(51) Int. Cl.
*H04L 45/02* (2022.01)
*H04L 65/1066* (2022.01)
(52) U.S. Cl.
CPC .............. *H04L 45/04* (2013.01); *H04L 45/02* (2013.01); *H04L 65/1066* (2013.01)
(58) Field of Classification Search
CPC . H04L 63/20; H04L 63/1458; H04L 63/1416; H04L 63/1425
See application file for complete search history.

(56) References Cited

U.S. PATENT DOCUMENTS 8,782,178 B2 * 7/2014 Rosenberg .......... H04L 61/5014
370/254
9,860,169 B1 * 1/2018 Ninan ..................... H04L 45/74
(Continued)

FOREIGN PATENT DOCUMENTS

JP 2008124757 A * 5/2008
WO WO-2012081823 A1 * 6/2012 ............. H04L 45/64

OTHER PUBLICATIONS

Rekhter Y. et al., "A Border Gateway Protocol 4 (BGP-4)", Request for Comments: 4271, Jan. 2006.
(Continued)

*Primary Examiner* — Yves Dalencourt
*Assistant Examiner* — Kidest Mendaye
(74) *Attorney, Agent, or Firm* — David D. Brush; Westman, Champlin & Koehler, P.A.

(57) ABSTRACT

A method of automatic setup by a first device of a session complying with a dynamic routing protocol with a second device. The setup method includes, subsequent to detection by the first device of existence of a connectivity with the second device, the first device being associated with a first autonomous system number and not knowing any autonomous system number associated with the second device: an exchange with the second device including announcement to the second device of the first autonomous system number, and discovery of a second autonomous system number with which the second device is associated; or allocation to the second device of a third autonomous system number and announcement to the second device of the third autonomous system number which has been allocated to it; and setup with the second device of a session according to the routing protocol by using the autonomous system numbers exchanged.

12 Claims, 4 Drawing Sheets

(56) References Cited

U.S. PATENT DOCUMENTS

| | | | |
|---|---|---|---|
| 10,560,431 B1* | 2/2020 | Chen | H04L 63/18 |
| 2009/0080414 A1* | 3/2009 | Boucadair | H04L 45/02 |
| | | | 370/352 |
| 2010/0265956 A1* | 10/2010 | Li | H04L 45/02 |
| | | | 370/401 |
| 2013/0117449 A1* | 5/2013 | Hares | H04L 9/40 |
| | | | 709/225 |
| 2015/0229512 A1 | 8/2015 | Dutti et al. | |
| 2015/0263899 A1* | 9/2015 | Tubaltsev | H04L 45/02 |
| | | | 370/254 |
| 2015/0263946 A1* | 9/2015 | Tubaltsev | H04L 49/354 |
| | | | 370/392 |
| 2016/0294612 A1 | 10/2016 | Ravinoothala et al. | |
| 2017/0163532 A1 | 6/2017 | Tubaltsev et al. | |
| 2019/0068494 A1* | 2/2019 | Tamizkar | H04L 65/102 |

OTHER PUBLICATIONS

Rosenberg J. et al., "Telephony Routing over IP (Trip)", Request for Comments: 3219, Jan. 2002.

Narten T. et al., "Neighbor Discovery for IP version 6 (IPv6)", Request for Comments: 4861, Sep. 2007.

Lindem, A. et al., "Extensions to OSPF for Advertising Optional Router Capabilities", Request for Comments: 4970, Jul. 2007.

International Search Report dated Jan. 14, 2019, for corresponding International Application No. PCT/FR2018/052935, filed Nov. 21, 2018.

Written Opinion of the International Searching Authority dated Jan. 23, 2019, for corresponding International Application No. PCT/FR2018/052935, filed Nov. 21, 2018.

J. Rosenberg, "RFC 3219—Telephony Routing over IP (TRIP)", Jan. 31, 2002 (Jan. 31, 2002), XP055484626.

English machine translation of Communication pursuant to Article 94(3) EPC dated Jan. 27, 2022 for related European Application No. 18 816 204.4.

A. Lindem et al., "BGP Logical Link Discovery Protocol (LLDP) Peer Discovery; draft-acee-idr-lldp-peer-discovery-01.txt", Internet Draft: Network Working Group, IETF, No. 1, Jul. 3, 2017, pp. 1-16, XP015120697.

\* cited by examiner

METHOD OF AUTOMATIC SETUP BY A FIRST DEVICE OF A SESSION COMPLYING WITH A DYNAMIC ROUTING PROTOCOL WITH A SECOND DEVICE

CROSS-REFERENCE TO RELATED APPLICATIONS

This Application is a Section 371 National Stage Application of International Application No. PCT/FR2018/052935, filed Nov. 21, 2018, which is incorporated by reference in its entirety and published as WO 2019/106260 on Jun. 6, 2019, not in English.

BACKGROUND OF THE INVENTION

The invention relates to the general field of telecommunications.

It relates more particularly to the configuration of devices of a telecommunications network implementing a dynamic routing protocol, such as the BGP (Border Gateway Protocol) or the TRIP (Telephony Routing over IP) protocol, for the calculation, the selection and the establishment of routes intended to carry the traffic through the network.

Such routing protocols are commonly used in the telecommunications networks to communicate routing information between different autonomous systems (AS). Typically the Internet network currently consists of several tens of thousands of autonomous systems, each of which being operated by a specific administrative entity, called network operator or administrator. Each autonomous system is identified by a globally unique number called autonomous system number or AS number (or ASN for AS Number).

The BGP protocol is increasingly used today in the network infrastructures (also more simply referred to as "networks" hereinafter) on which the data centers (or DC) are based, and in particular the large data centers, also known as MSDC (Massively Scalable Data Centers) or HSDC (Hyper-Scale Data Centers). The BGP protocol allows within these network infrastructures to exchange routing information between the different equipment of the network (e.g. routers, controllers, switches, etc.). The network infrastructure of a data center can constitute a fullfledged autonomous system or be organized according to a set of autonomous systems that can, for example, form a "BGP confederation" when the infrastructure is massively distributed. Within such a network infrastructure, private AS numbers, i.e. numbers not visible in the Internet, are often used to facilitate the management of the BGP routing policy without having to require the assignment of a globally unique AS number. This makes it easier to distinguish the network infrastructure of the data center per se from the network to which this infrastructure is connected and to which a separate AS number is assigned. Within the network infrastructure of the data center, the same AS number can for example be used by several routers located on the same hierarchical level. Also, BGP extensions specific to the data centers (e.g. "allowas-in") have been developed by some manufacturers to be able to use the same AS number in different hierarchical levels.

The deployment of a data center requires a very high level of automation of the resource production processes (e.g. dynamic production of virtual machines intended to host some virtualized network functions), in order to simplify the procedures for configuring the equipment of the network infrastructure of the data center and minimize the risks of errors. Such automation further allows improving the availability and stability of the network: any modification of the topology of the network infrastructure linked to the introduction of new switching (e.g. switches, routers) or transmission (e.g. intra- and inter-center data links intended to provide more capacity to handle more traffic) resources must be done in a dynamic manner requiring minimal configuration effort or no configuration effort at all.

In addition, it is important to control the volumetry of the signaling traffic consisting in particular of configuration information emitted within the network infrastructure, typically by one or more network controllers when the data center is based on a Software-Defined Networking (SDN) type architecture, for example. This signaling traffic can also comprise notifications emitted by some equipment of the network when they detect a modification in its topology, for example the breaking of a connection between two switches located within the same data center. It is imperative to ensure that the volumetry of the signaling traffic exchanged does not in any way penalize the availability of the service(s) that would involve resources hosted within the infrastructure of the data center.

In order to optimize the exploitation of the resources within a data center, the configuration of the equipment of the underlying network must comply with adequate procedures for the nomenclature of the interfaces, the addresses allocated to these interfaces, etc. Particularly, the implementation of a routing policy within the network infrastructure of the data center according to a routing protocol such as BGP is based on the establishment of BGP sessions between the different equipment of the network. The establishment of BGP sessions between all the equipment of an autonomous system is imperative to guarantee a global and coherent vision of the topology of the network infrastructure. These BGP sessions are established on the basis of various configuration information such as in particular the autonomous system number(s) (or AS number) to which each equipment belongs. The AS number is mandatory information in order to establish a BGP session between two routers: each of the routers must know not only its own AS number but also that of the other router to be able to establish a BGP session therewith. The AS number is also used to select the BGP routes and to detect and prevent routing loops within the network infrastructure.

In the current state of the art, the process of configuring the characteristic functions of the activation of a dynamic routing protocol such as BGP within a network infrastructure (of a data center, or any other network infrastructure), requires the explicit configuration of each piece of equipment of the network by the operator of the network. This configuration is carried out for example via the programming by the administrator of the network of a plurality of elementary tasks, during which the administrator of the network connects to each piece of equipment on the network in order to configure all of the parameters that each piece of equipment needs for the establishment of BGP sessions with its peers. As mentioned earlier, the BGP peers must have their own AS numbers, the AS numbers of their neighbors, the IP address(es) of their neighbors, and an explicit instruction to activate the BGP protocol and establish BGP sessions with their neighbors.

Such a configuration procedure is complex and therefore requires human, often time-consuming, intervention with high risks of errors which can prove to be harmful (for example, by penalizing access to the data center or to an equipment subset of the center).

OBJECT AND SUMMARY OF THE INVENTION

The invention allows overcoming in particular this drawback by proposing a method for automatically establishing, by a first network device, a session complying with a dynamic routing protocol with a second network device, the first device being associated with a first autonomous system number and not knowing any autonomous system number associated with the second device, said method comprising, following the detection by the first device of the existence of a connectivity with the second device:

- a step of exchange with the second device comprising the advertisement to the second device of the first autonomous system number, said exchange step further comprising:
  - the discovery of an autonomous system number, called second autonomous system number, with which the second device is associated; or
  - the allocation to the second device of an autonomous system number, called third autonomous system number and the advertisement to the second device of the third autonomous system number that has been allocated thereto; and
- a step of establishing with the second device at least one session according to said routing protocol by using the autonomous systems numbers exchanged between the first and the second device.

It will be noted that the first device and the second device can be either direct neighbors or distant neighbors. The detection by a first device of the existence of a connectivity with a second device within the meaning of the invention can thus comprise the detection of an active link or of an active interface (for example of a physical connection) between the first and the second device, or comprise the detection of the existence of a route allowing the first device to join the second device (i.e. comprising a plurality of intermediate nodes between which there are active links or active interfaces to allow the first device to join the second device). The detection of connectivity can be carried out using mechanisms known in the state of the art, for example, the mechanism for discovering functional capabilities OSPF ("Extensions to OSPF for Advertising Optional Router Capabilities", RFC 4970) or DNS-SD (DNS Service Discovery).

Correlatively, the invention also relates to a network device, called first device, configured to automatically establish a session complying with a dynamic routing protocol with a second network device, the first device being associated with a first autonomous system number and not knowing any autonomous system number associated with the second device, said first device comprising a plurality of modules, activated following the detection by the first device of the existence of a connectivity with the second device, said plurality of modules comprising:

- a module for exchange with the second device, configured to:
  - make an advertisement to the second device of the first autonomous system number;
  - discover an autonomous system number, called second autonomous system number, with which the second device is associated, or allocate to the second device an autonomous system number, called third autonomous system number and make an advertisement to the second device of the third autonomous system number that has been allocated thereto; and
- an establishment module, configured to establish with the second device at least one session according to said routing protocol by using the autonomous system numbers exchanged between the first and the second device.

The invention further relates to a method for communication with a first network device implemented by a second network device, said method comprising:

- a step of exchange with the first device comprising:
  - the receipt from the first device of an autonomous system number, called first autonomous system number, associated with the first device;
  - the storage of the first autonomous system number in association with the first device;
- said exchange step further comprising:
  - the provision of the first device with an autonomous system number, called second autonomous system number, with which the second device is associated; or
  - the receipt from the first device of an autonomous system number, called third autonomous system number, allocated by the first device to the second device and, if the second device is not already associated with an autonomous system number, the configuration of the second device with the third autonomous system number;
- a step of establishing with the first device at least one session according to said routing protocol by using the autonomous system numbers exchanged between the first and the second device.

Correlatively, the invention also relates to a network device, called second device, configured to automatically establish a session complying with a dynamic routing protocol with a first network device, said second device comprising:

- a module for exchange with the first device, configured to:
  - receive from the first device an autonomous system number, called first autonomous system number, associated with the first device;
  - store the first autonomous system number in association with the first device;
- said exchange module being further configured to:
  - provide the first device with an autonomous system number, called second autonomous system number, with which the second device is associated; or
  - receive from the first device an autonomous system number, called third autonomous system number, allocated by the first device to the second device and, if the second device is not already associated with an autonomous system number, configure the second device with the third autonomous system number; and
- an establishment module, configured to establish with the first device at least one session complying with said routing protocol by using the autonomous system numbers exchanged between the first and the second device.

The invention applies for example to a dynamic routing protocol such as the BGP protocol or the TRIP protocol.

The invention therefore proposes a method for automatically establishing sessions complying with a dynamic routing protocol and characteristics of the activation of the dynamic routing protocol in the network between different network devices, as soon as a connectivity (a physical connection, for example) between these devices is detected. There is no limitation attached to the nature of the considered network devices: these are any network elements, such as routers, switches, etc.

Unlike the state of the art, thanks to the invention, it is no longer necessary for the administrator of the network to perform the systematic and complete manual configuration of all the devices of the network with their AS numbers and with that of their neighbors, nor with explicit instructions to establish sessions, so that sessions according to the dynamic routing protocol are established with a view to activating the routing protocol in the network. The invention indeed proposes a mechanism of automatic advertisement and discovery of the parameters necessary for the establishment of the sessions according to the dynamic routing protocol which then allows automating the establishment of these sessions. The establishment of the session can be either at the initiative of the first device or of the second device.

Once a device of the network (first device within the meaning of the invention) has been configured with its AS number, it is able according to the invention, when it detects a connectivity (for example, a physical connection) with another device of the network (second device within the meaning of the invention), to establish a session with this other device. It is noted that there is no limitation attached to the way in which the first device has been configured beforehand with the AS number associated therewith. It can be a manual configuration performed by the administrator or the operator of the network, or an AS number that has been allocated thereto or simply communicated by another device of the network such as for example a controller of the network, etc.

Several cases are considered by the invention:
the first and second devices are configured (for example manually by the administrator of the network or by any other means) only with their own AS numbers: the first device then makes an advertisement of its AS number to the second device and discovers automatically the AS number of the second device (second AS number within the meaning of the invention), via a discovery message sent to the second device or via an advertisement message received from the second device. Once the AS numbers have been exchanged between the first and the second device, a session according to the dynamic routing protocol is automatically established by using these AS numbers;
the first device is configured with its AS number and a range of values from which it can select an AS number for the second device: the first device then makes an advertisement of its AS number to the second device and allocates thereto an AS number (third AS number within the meaning of the invention). It makes an advertisement of the AS number allocated to the second device via a message sent thereto which is then configured with the AS number that has been allocated thereto by the first device if it does not already have one. The second device is therefore associated with the third AS number. A session according to the dynamic routing protocol is then automatically established by using the AS numbers exchanged between the two devices.

In a particular embodiment, the exchange step of the automatic establishment method further comprises, following the allocation of the third autonomous system number to the second device:
the receipt of a response from the second device refusing the third autonomous system number that has been allocated thereto by the first device and comprising a fourth autonomous system number with which the second device is already associated; and
the storage of the fourth autonomous system number in association with the second device in replacement of the third autonomous system number.

Similarly, if the second device is already associated with an autonomous system number, called fourth autonomous system number, the exchange step of the communication method according to the invention comprises, in this embodiment, the rejection of the third autonomous system number allocated by the first device and the provision of the first device with the fourth autonomous system number with which the second device is associated.

Correlatively, the exchange module of the second device is configured, if the second device is already associated with an autonomous system number, called fourth autonomous system number, to reject the third autonomous system number allocated by the first device and provide the first device with the fourth autonomous system number with which the second device is associated.

The invention advantageously makes it possible to manage, in this embodiment, the case where the second device already has an AS number with which it has been previously configured (fourth autonomous system number within the meaning of the invention) when it receives an AS number allocated by the first device. In this embodiment, the second device keeps the AS number that has been previously assigned thereto and refuses the new AS number allocated by the first device in order to limit the impact on the other devices on the network and, when appropriate, on the sessions already established between the second device and other devices of the network.

Note that, as for the first device, there is no limitation attached to the way in which the second device was configured beforehand with the fourth AS number. It can be a manual configuration performed by the operator of the network, or an AS number that has been allocated thereto by a device of the network other than the first device, or communicated via a controller, etc.

In another embodiment, to avoid such a situation, it can be considered that the first device detects, prior to the allocation of an autonomous system number to the second device, if the second device is already associated with an autonomous system number, for example by sending thereto a message to discover the autonomous system number associated with the second device.

In general, the invention allows improving the level of automation of the procedure for configuring the devices of a network and in particular for establishing sessions between these devices for the activation of the dynamic routing protocol in the network. This level of automation satisfies in a privileged but not limiting manner the requirements of the large data centers such as the MSDC or HSDC data centers mentioned above, and allows a simplification of the operations within the underlying network infrastructures. The invention also makes it possible to minimize the risks of error to which are typically exposed configuration procedures executed manually by an administrator of the network, and to reduce the operating costs linked to the configuration of the network.

The invention further offers the possibility of easily taking into account a change in the topology of the network, and in particular the addition of devices in the network. These devices do not need to be configured beforehand and statically with an AS number nor with the AS number of their neighbors in the network to be able to establish sessions according to the dynamic routing protocol with these neighbors. The configuration can be carried out dynamically thanks to the invention, while furthermore limiting the volumetry of the signaling traffic necessary for this configuration.

A great flexibility in implementing the invention is noted, which can adapt to different routing policies, to different types of networks, to different topologies of networks (for example, to an organization in clusters, in hierarchical levels, etc.) and to different configurations of networks (for example, to a configuration according to which private AS numbers are used, to a configuration according to which separate AS numbers are allocated to hierarchical levels or to separate clusters, etc.).

In a particular embodiment of the invention, the automatic establishment method further comprises a step of sending by the first device to the second device a range of autonomous system numbers from which the second device can draw to allocate an autonomous system number to at least a third device (for example, a device with which the second device has established a physical connection).

In this way, if the second device detects a third network device, it can in turn allocate an AS number thereto in order to be able to automatically establish a session according to the dynamic routing protocol considered with this third device, particularly if it does not already have a preconfigured AS number.

Thanks to the exchange of AS numbers provided between the first and the second device, the invention can apply to different dynamic routing protocols, and in particular has a preferred application in the case of BGP (Border Gateway Protocol) and TRIP (Telephony Routing over IP) dynamic routing protocols, for which the AS number is an essential information for the establishment of sessions.

It should be noted that when the routing protocol is the TRIP protocol, the exchange step preferably further comprises:

the advertisement of a first IP Telephony Administrative Domain identifier associated with the first device; and
the discovery of a second IP Telephony Administrative Domain identifier associated with the second device, or the allocation and exchange of a third IP Telephony Administrative Domain identifier to the second device.

This embodiment makes it possible to adapt to the specificities of the TRIP protocol which, for the establishment of TRIP sessions between two devices, is based, in addition to the AS numbers associated with these devices, on IP Telephony Administrative Domain identifiers (also referred to as ITAD) associated with these devices.

In a particular embodiment, when the routing protocol is the BGP protocol, the advertisements to the second device of the first and when appropriate, of the third autonomous system number can be carried out by means of a BGP session establishment message OPEN sent by the first device to the second device.

In this embodiment, the establishment of the session is on the initiative of the first device, and is requested at the same time as the first device makes an advertisement to the second device of its AS number and possibly an AS number it allocated to the second device. This embodiment advantageously proposes to exploit an existing message (BGP session establishment message OPEN) already described in the specification of the BGP routing protocol (RFC 4271) and to minimize the number of messages exchanged between the two devices. It is noted that there is no limitation attached to the way in which said session establishment message is modified to convey the third autonomous system number when appropriate. This can be done, for example, by adding an option in the message or a new field comprising the third AS number allocated to the second device.

Other types of messages can be used alternatively. For example, in another embodiment, the advertisements of the first and third autonomous system numbers and/or the discovery of the second autonomous system number are carried out by means of router advertisement messages and/or router solicitation messages.

This other embodiment thus makes it possible to exploit messages (i.e. RA (Router Advertisement) and RS (Router Solicitation) messages) of the prior art described in the specification of the protocol "Neighbor Discovery for Internet Protocol version 6" (RFC 4861). It is noted that the same message (e.g. an RS message) can be used both to make an advertisement of an autonomous system number and to discover another autonomous system number. Alternatively, new messages can be defined to convey the information exchanged according to the invention between the first and the second device.

The same applies for the other routing protocols to which the invention applies: messages already defined by the protocol can be used (through the modification of these messages to convey the information exchanged between the two devices), or new messages can be defined.

In a particular embodiment, the different steps of the automatic establishment method and/or the different steps of the communication method according to the invention are determined by computer program instructions.

Consequently, the invention also relates to a computer program on an information medium, this program being capable of being implemented in a network device or more generally in a computer, this program including instructions adapted to the implementation of the steps of an automatic establishment method as described above.

The invention also relates to a computer program on an information medium, this program being capable of being implemented in a network device or more generally in a computer, this program including instructions adapted to the implementation of the steps of a communication method as described above.

Each of these programs can use any programming language, and be in the form of source code, object code, or intermediate code between source code and object code, such as in a partially compiled form, or in any other desirable form.

The invention also relates to an information or recording medium readable by a computer, and including instructions of a computer program as mentioned above.

The information or recording medium can be any entity or device capable of storing the program. For example, the support may include a storage means, such as a ROM, for example a CD ROM or a microelectronic circuit ROM or a magnetic recording means, for example a floppy disc or a hard disc.

On the other hand, the information or recording medium can be a transmissible medium such as an electrical or optical signal, which can be carried via an electrical or optical cable, by radio or by other means. The program according to the invention can in particular be downloaded on an Internet-type network.

Alternatively, the information or recording medium can be an integrated circuit in which the program is incorporated, the circuit being adapted to execute or to be used in the execution of the method in question.

The invention also relates to a communication system comprising at least a first network device according to the invention and at least a second network device according to the invention, configured to automatically establish therebetween a session complying with a dynamic routing protocol.

The system according to the invention benefits from the same advantages mentioned above as the establishment and communication methods.

It can also be considered, in other embodiments, that the establishment method, the communication method, the first network device, the second network device and the communication system according to the invention have in combination all or part of the above characteristics.

BRIEF DESCRIPTION OF THE DRAWINGS

Other characteristics and advantages of the present invention will emerge from the description given below, with reference to the appended drawings which illustrate an exemplary embodiment thereof devoid of any limiting character. In the figures.

DETAILED DESCRIPTION OF THE INVENTION

Figure 1:
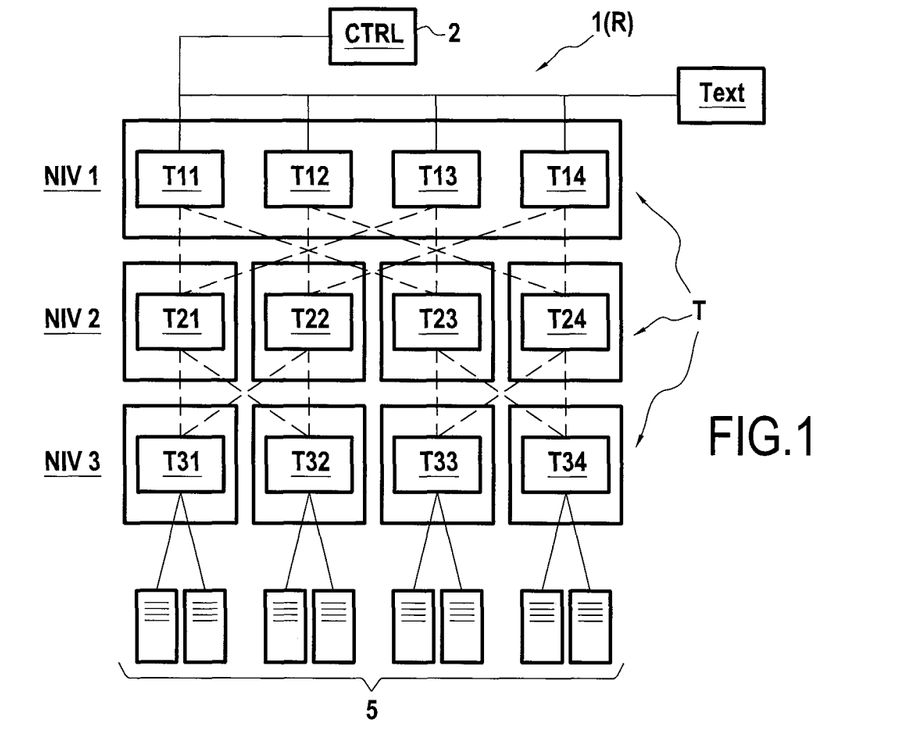
FIG. 1 diagrammatically represents a communication system according to the invention in a particular embodiment.

FIG. 1 represents, in its environment, a communication system 1 according to the invention, in a particular embodiment.

This embodiment comprises the detection of a "directly connected" i.e. physically connected neighbor node (active link or active interface). Alternatively, it is also possible to consider non-directly connected nodes (i.e. remote nodes); in this case, the "multi-hop BGP" function (RFC4271) is preferably activated by the BGP nodes.

In the example considered in FIG. 1, the communication system 1 comprises a plurality of network devices (referenced by means of the letter T, possibly followed by a complement (e.g. T11 or T or even T')) belonging to the network infrastructure of a data center (DC). The devices T are interconnected via one or more communication interfaces (illustrated in the figure in broken lines) and form a communication network R.

There is no limitation attached to the nature of the network devices T (also called nodes of the network R): they are any network elements, such as for example routers, switches, etc. No limitation is attached either to the nature of the communication interfaces used by the devices T to communicate together within the network R. They may be mobile or fixed, wired or wireless communication interfaces, etc.

The communication network R formed by the devices T uses a dynamic routing protocol. The invention allows automatic establishment of sessions complying with this routing protocol between different network devices T in order to activate the use of the dynamic routing protocol in the network R. In the embodiment described here, the considered dynamic routing protocol is the BGP protocol.

As mentioned above, in accordance with the BGP protocol, to establish sessions with their neighbors in the network R (i.e. with the devices of the network R with which they have an established physical connection), the different devices of the network R must know the autonomous system number(s) that is (are) associated thereto (i.e. to which they are attached), as well as the autonomous system numbers associated with their neighbors. The invention allows an automatic exchange of these AS numbers between two neighbor devices without requiring, as in the prior art, a prior static (e.g. "manual") configuration of these devices with each of these pieces of information (i.e. AS number of the considered device and AS numbers of its neighbors). The invention indeed allows a dynamic configuration of the devices of the network with this information when at least one device of the network R is configured with its own AS number and/or has a range of values in which the AS numbers of its neighbors can be allocated, as more detailed later. This range can be contiguous or non-contiguous.

The network infrastructure on which the data center is based implements here SDN architecture. This assumption is not, however, a prerequisite for implementing the invention.

The SDN network infrastructure comprises, in addition to the network devices T, a controller 2 enabling coherent and deterministic operation of the network R of the data center. The controller 2 has, in a known manner, a global and systemic vision of the network R, of its topology, of its components, of the available network functions (virtualized or not), of their status, etc. This controller 2 is capable of defining a routing policy within the network R, based on the BGP protocol, and making it possible to carry the traffic of the data center in accordance with the objectives set by the operator of the data center. It is, in the example illustrated in FIG. 1, connected to one of the network devices T, namely to the device T11.

In the example illustrated in FIG. 1, the communication system 1 is organized into a plurality of hierarchical levels (three in FIG. 1 referenced NIV1, NIV2 and NIV3), each hierarchical level being itself organized in one or more clusters (i.e. groups) of devices: a cluster for the hierarchical level NIV1 comprising four devices T11, T12, T13 and T14, four clusters for the hierarchical level NIV2 each comprising respectively a device T21, T22, T23 and T24, and four separate clusters also for the hierarchical level NIV3 each comprising respectively the four devices T31, T32, T33 and T34. The network devices of the last hierarchical level NIV3 are connected here to the various virtual or hardware machines (for example servers) of the data center (generally referred S).

Of course, this network infrastructure architecture and its organization into hierarchical levels and into clusters (comprising one or more devices) is given only by way of illustration, and the invention applies to other types of architectures (having a central unit such as the controller 2 or not). The choice of the architecture of the network R comes under the engineering and the topology of the network, under the size of the data center, etc.

As mentioned previously, the use of the dynamic routing protocol BGP within the network R formed by the devices T requires the allocation of autonomous system numbers to each of these devices. In the example considered in FIG. 1, the following choices are made by the operator of the data center for this allocation:

use of private AS numbers (for example, belonging to the range 64512-65524 or to the range of values 4200000000-4294967294 in the case of AS numbers coded on 4 bytes); and use of the same AS number for the network devices located at the same hierarchical level and belonging to the same cluster.

This AS number allocation policy is given for illustrative purposes only. Other policies may be adopted by the operator of the data center (for example, allocation of the same AS number for all devices belonging to the same hierarchical level, or of the same AS number for all devices of the network, separate AS numbers per address family; etc.).

Figure 2:
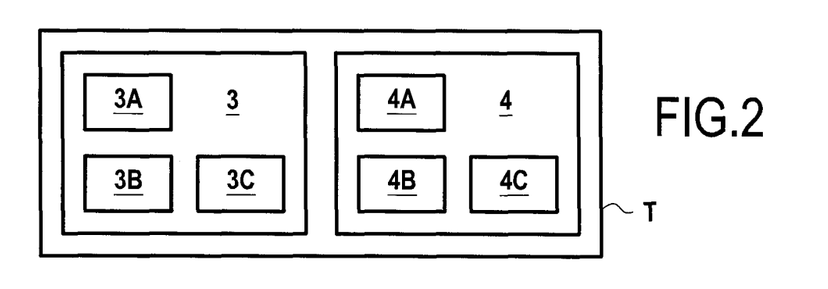
FIG. 2 illustrates a network device of the communication system of FIG. 1, according to the invention in a particular embodiment.

In the embodiment described here, the devices T of the network R all comply with the invention: as illustrated in FIG. 2, each device T of the network is equipped here with both means 3 enabling it to establish BGP sessions automatically with its neighbors (i.e. with the other devices of the network R with which it has an established physical, i.e. active connection) according to the invention and to act as a first device within the meaning of the invention with regard thereto, and means 4 enabling it to communicate with its neighbors according to the invention and to act as a second device within the meaning of the invention with regard thereto. However, the means 3 and 4 are not necessarily activated simultaneously, depending on the configuration of the device T. Thus, for example, if the device T is not associated with an AS number with which it has been previously configured (this AS number being stored as such in one of its memories, for example in a non-volatile memory), the means 3 are deactivated while its means 4 can be activated. Conversely, as soon as a device T is configured with an AS number associated therewith, its means 3 can be activated (instead of the means 4 or simultaneously with the means 4).

These assumptions are not limiting. Alternatively, it is possible to consider configuring some devices of the network R so as to fulfill only the functions of a first device within the meaning of the invention (in other words, these devices are only equipped with means 3). This can be the case for example of the devices belonging to the hierarchical levels having the weakest indices (for example at the level VIN1). It is also possible to consider configuring some devices of the network R (for example the devices belonging to the hierarchical level having the highest index, such as at the level NIV3 in FIG. 1) so as to fulfill only the functions of a second device within the meaning of the invention (in other words, these devices are only equipped with means 4).

Figure 3:
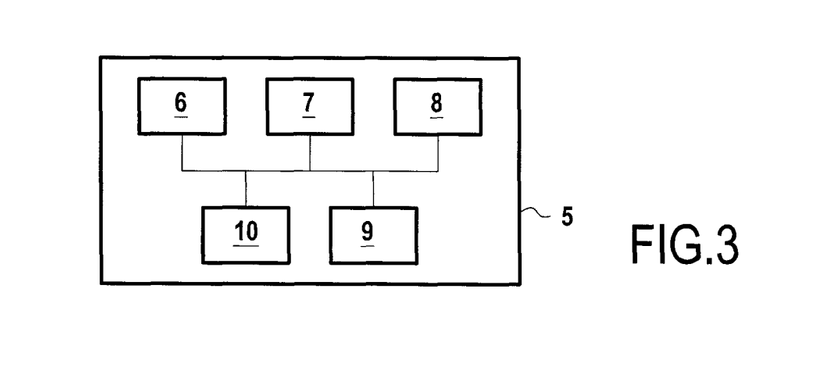
FIG. 3 represents the hardware architecture of the network device of FIG. 2, in a particular embodiment.

In the embodiment described here, the devices T of the network R according to the invention have the hardware architecture of a computer 5 as illustrated in FIG. 3. They comprise in particular a processor 6, a random access memory 7, a read-only memory 8, a non-volatile flash memory 9, as well as communication means 10 comprising one or several communication interface(s).

The communication means 10 allow each device T to be connected to one or several other devices T of the network R, and to communicate with these other devices in particular for routing and carrying the traffic within the network, by using the BGP protocol. To this end, the devices T are configured here to listen by default on the TCP port 179, in order to receive the messages relating to the BGP protocol. In order to differentiate the procedure for automatically establishing BGP sessions from the one defined by the current standard, other port numbers can be used if the devices T have been instructed for this purpose beforehand.

The read-only memory 8 of each network device T constitutes a recording medium according to the invention, readable by the processor 6 and on which computer programs PROG3 and PROG4 are recorded according to the invention: the program PROG3 includes instructions for the execution of the steps of the automatic establishment method according to the invention, while the program PROG4 includes instructions for the execution of the steps of the communication method according to the invention.

More particularly, the computer program PROG3 defines functional (and software here) modules of the means 3 of the device T, which are configured to implement the steps of the method for automatically establishing a BGP session according to the invention with another device of the network R here referred to as T', when the means 3 of the device T are activated. It is assumed here that the means 3 of the device T are only activated to establish a BGP session with the device T' only when the device T is already configured with an autonomous system number associated thereto (i.e., to which it is attached); however, the device T ignores, before implementing the automatic establishment method, any autonomous system number associated with the device T' (in other words, the device T does not know an autonomous system number associated with the device T', that is to say, it has not been configured with any autonomous system number associated with the device T').

The functional modules defined by the program PROG3 are based on and/or control the hardware elements 6-10 of the computer 5 cited above, and comprise in particular here, as illustrated in FIG. 2:

- a detection module 3A configured to detect the establishment or existence of a physical connection with the device T';
- an exchange module 3B, configured to:
  - make an advertisement to the network device T' of the autonomous system number (first autonomous system number within the meaning of the invention) with which the device T is configured when appropriate and which is associated therewith;
  - discover an autonomous system number (second autonomous system number within the meaning of the invention), with which the device T' is associated where appropriate or allocate to the device T' an autonomous system number (third autonomous system number), and make an advertisement to the device T' of the autonomous system number that has been allocated thereto;
- and an establishment module 3C, configured to establish with the device T' a session according to the routing protocol BGP by using the autonomous system numbers associated with the devices T and T'.

The computer program PROG4 defines functional (and software here) modules of the means 4 of the network device T, defined to implement the steps of the communication method according to the invention with another device referred to as T" of the network R, when the means 4 of the device T are activated. The means 4 of the device T can be activated whether or not it has been previously configured with an autonomous system number to which it is attached. It is assumed here that the device T does not know (in other words, ignores) the autonomous system number possibly associated with the device T" (i.e., it was not configured prior to the implementation of the method for communication with the autonomous system number associated with the device T").

The functional modules defined by the program PROG4 are based on and/or control the hardware elements 6-10 of the computer 5 cited above, and comprise in particular here, as illustrated in FIG. 2:

- a detection module 4A configured to detect the establishment or existence of a physical connection with the device T (this detection module can be the same shared function where appropriate with the detection module 3A defined by the program PROG3);
- a exchange module 4B configured to:
  - receive an advertisement message from the device T" comprising an autonomous system number (first autonomous system number within the meaning of the invention) associated with the device T";
  - store this autonomous system number in association with the device T";

the exchange module 4B being further configured to:
receive a solicitation message from the device T" inviting the device T to provide it with an autonomous system number (second autonomous system number within the meaning of the invention), with which the device T is associated where appropriate and provide the device T" with the autonomous system number with which the device T is associated; or
receive an advertisement message from the device T" comprising an autonomous system number (third autonomous system number within the meaning of the invention), allocated by the device T" to the device T and:
if the device T is not already associated with an autonomous system number, configure the device T with this autonomous system number allocated by the device T";
if the device T is however already associated with an autonomous system number, reject the autonomous system number allocated by the device T" and provide the device T" with the autonomous system number with which the device T is already associated;
and an establishment module 4C, configured to establish with the device T" a session according to the BGP routing protocol by using the autonomous system numbers associated with the devices T and T".

Figure 4:
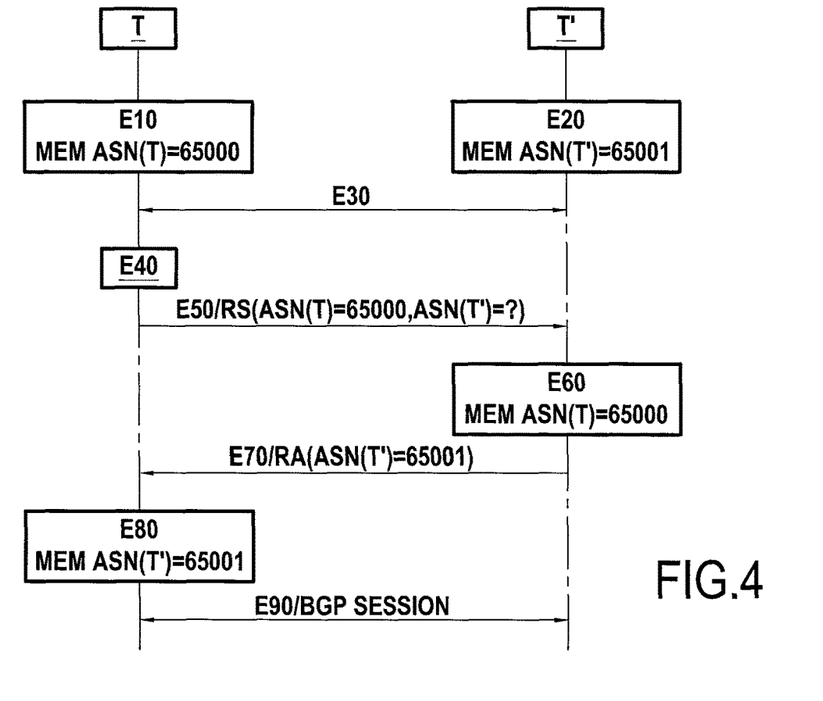
FIGS. 4 to 6 illustrate the main steps of the automatic establishment and communication methods implemented by the communication devices of the system in FIG. 1, in different embodiments.
Figure 5:
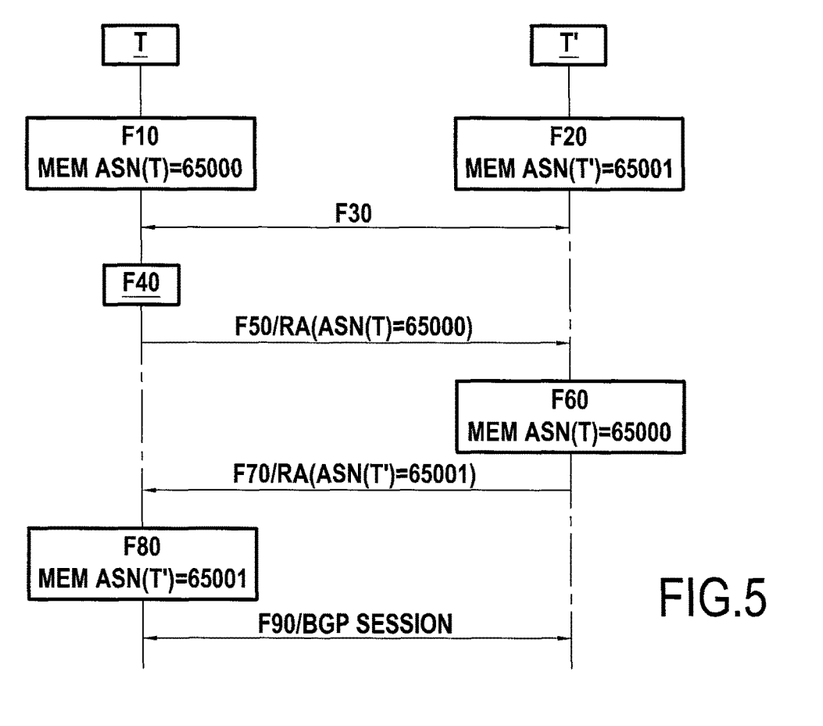
Figure 6:
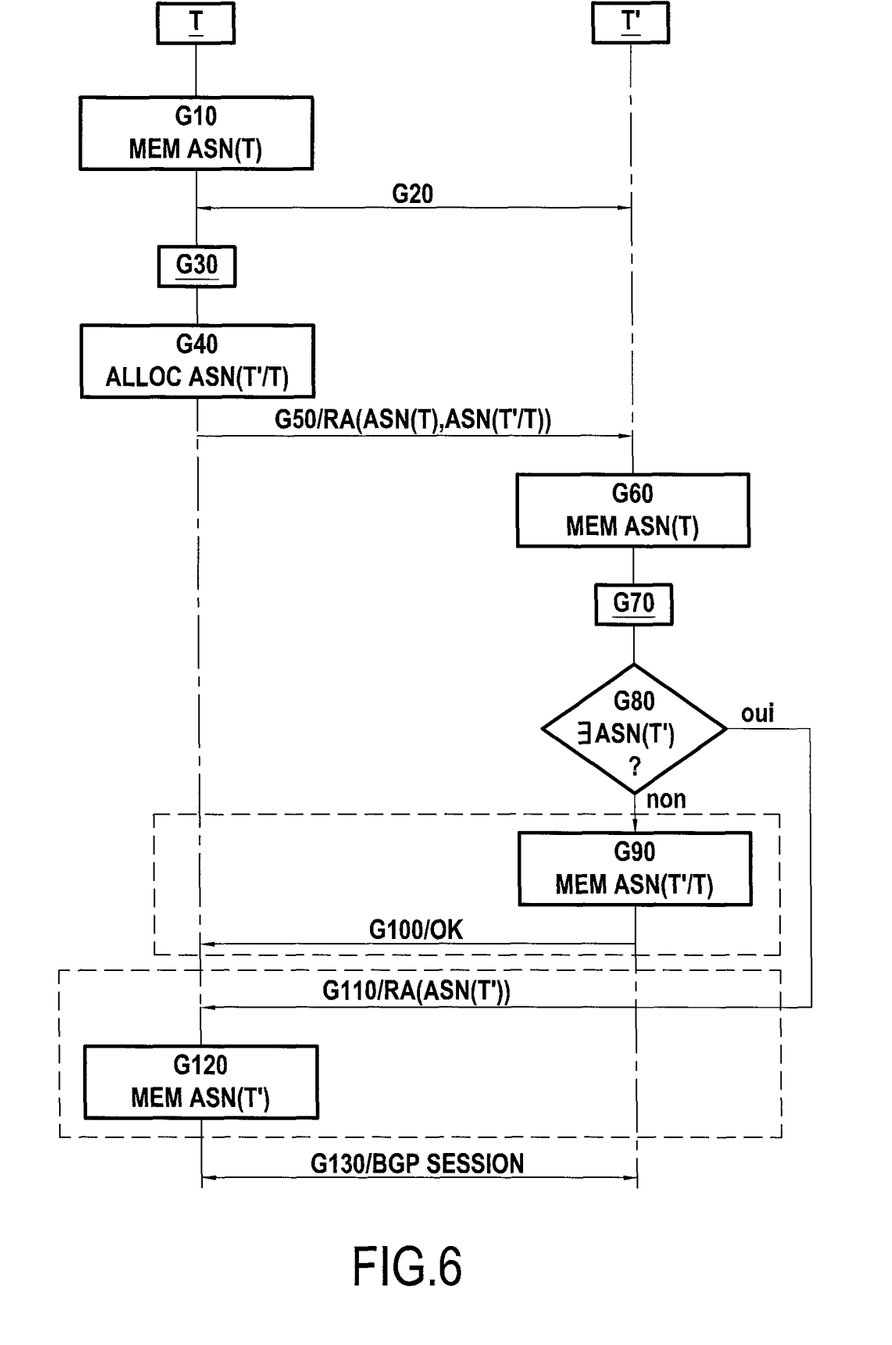

FIGS. 4 to 6 illustrate the main steps of the automatic establishment and communication methods implemented respectively by the means 3 and 4 of the devices T of the network R in different embodiments and different contexts.

More specifically, FIG. 4 illustrates a first embodiment in which a device T of the network R is configured with a private autonomous system number with which it is associated (noted ASN(T) with for example ASN(T)=65500) (step E10). It is assumed in the example illustrated in FIG. 4 that the device T is only configured with its autonomous system number and does not know the autonomous system numbers possibly associated with the other devices of the network R. The device T is for example here the device T11 belonging to the hierarchical level NIV1 of the network R illustrated in FIG. 1. The means 3 of the device T are assumed to be activated. The invention does not impose any chronology concerning steps E50 and E70.

There is no limitation attached to the way in which the configuration of device T with the autonomous system number ASN(T) was carried out. For example, this configuration could be carried out by the administrator of the network R by connecting thereto via a Telnet session, or by using a protocol such as NETCONF. Alternatively, this configuration could be carried out via the controller 2. The autonomous system number ASN(T) is stored in the non-volatile memory 7 of the device T.

In the example illustrated in FIG. 4, a device T' of the network R is also considered, configured with a private autonomous system number noted ASN(T') with which it is associated. For example ASN(T')=65001 (step E20). It is assumed in the example illustrated in FIG. 4 that the device T' is only configured with its own autonomous system number ASN(T') and does not know the possible autonomous system numbers associated with the other devices on the network R, and particularly the one associated with the device T. The device T' is for example here the device T21 belonging to the hierarchical level NIV2 of the network R illustrated in FIG. 1. The means 4 of the device T' are assumed to be activated. It is assumed here for the sake of simplification that the means 3 of the device T' are deactivated.

As with the device T, there is no limitation attached to the way in which the configuration of the device T' with the autonomous system number ASN(T') was carried out. This configuration could be carried out by the administrator of the network R by connecting thereto via a Telnet session, or by using a protocol such as NETCONF. Alternatively, this configuration could be carried out via the controller 2 or via another device of the network, for example by a device of the hierarchical level NIV1 such as the device T12, T13 or T14 (as detailed further subsequently with reference to FIG. 6). The autonomous system number ASN(T') is stored in the non-volatile memory 7 of the device T'.

It is now assumed that a physical connection is established between the device T and the device T', via their respective communication means 10 (step E30). Such a physical connection can be established for example by means of the link-local addresses of the devices T and T'. These link-local addresses are, in a manner known per se, automatically configured on a network device during the initialization of its communication interfaces; they allow two neighbor network devices to communicate via said communication interfaces, and are exchanged between these two neighbor devices, for example via a neighbor discovery protocol.

The establishment of the physical connection between the device T and the device T' is detected by the detection module 3A of the device T (step E40).

This triggers an exchange with the device T' initialized by the module 3B of the device T.

More specifically, during this exchange, the device T, via its module 3B, makes an advertisement to the device T' of the autonomous system number ASN(T) associated therewith (step E50). In the example illustrated in FIG. 4, this advertisement is made via the sending by the module 3B of the device T (and via the communication means 10 of the device T and the physical connection established with the device T') of a router solicitation RS message to the device T'. This RS message comprises, in a field or in an option of the message, the autonomous system number ASN(T).

In addition, by means of this same solicitation RS message, the module 3B of the device T solicits the device T', in a field or an option of the message provided for this purpose, so that it provides it with the autonomous system number ASN(T') assigned thereto (discovery of the autonomous system number associated with the device T' within the meaning of the invention).

In other words, the same solicitation RS message is used both here for the advertisement of the autonomous system number associated with device T and for the discovery of the autonomous system number associated with device T'. This makes it possible to limit the signaling exchanged between the devices T and T'. Alternatively, separate messages can be used; for example, the advertisement of the autonomous system number ASN(T) can be carried out by means of a router advertisement RA message and the discovery of the autonomous system number ASN(T') can be carried out by means of a router solicitation RS message.

Upon receipt of the RS message sent by the device T, the module 4B of the device T' extracts the autonomous system number ASN(T) associated with the device T and stores it, for example in its non-volatile memory 7, in association with the device T (step E60).

Then it responds to the device T by providing it with (making an advertisement of) the autonomous system number ASN(T') associated therewith (step E70). In the example illustrated in FIG. 4, the autonomous system number ASN (T') is provided to the device T in an advertisement RA message, in a field or an option of this message.

Upon receipt of the RA message sent by the device T', the module 3B of the device T extracts the autonomous system number ASN(T') associated with the device T' and stores it, for example in its non-volatile memory 7, in association with the device T' (step E80).

Once the exchange of the autonomous system numbers between the devices T and T' has ended, a BGP session is automatically established between these two devices, in a manner known per se (step E90). This BGP session can be established either on the initiative of the device T via its establishment module 3C, or on the initiative of the device T' via its establishment module 4C, for example by sending a BGP message OPEN as expected by the BGP protocol.

It is noted that in this example, the exchange of the autonomous system numbers was initialized by the device T via its means 3. Alternatively, it can be considered that the means 3 of the device T' are also activated and that the latter is at the origin of this exchange.

FIG. 5 illustrates a second embodiment of the invention. In this second embodiment of the invention, the devices T and T' are configured as in the example of FIG. 4, each with the autonomous system number with which they are associated (respectively ASN(T)=65500 (step F10) and ASN(T') =65501 (step F20)). It is assumed in the example illustrated in FIG. 5 that the device T does not know the autonomous system number possibly associated with the device T' and vice versa.

For the sake of simplification, it is assumed here that only the means 3 of the device T are activated and only the means 4 of the device T' are activated.

It is assumed that a physical connection is established between the device T and the device T', via their respective communication means 10 in a manner identical to what has been described in step E30 in the first embodiment (step F30).

The establishment of the physical connection between the device T and the device T' is detected by the detection module 3A of the device T (step F40).

This triggers an exchange with the device T' initialized here by the module 3B of the device T.

More specifically, during this exchange, the device T, via its module 3B, makes an advertisement to the device T' of the autonomous system number ASN(T) associated therewith (step F50). In the example illustrated in FIG. 4, this advertisement is made via the sending by the module 3B of the device T (and via the communication means 10 of the device T and the physical connection established with the device T') of a router advertisement RA message to the device T'. This RA message comprises, in a field or in an option of the message, the autonomous system number ASN(T).

Upon receipt of the RA message sent by the device T, the module 4B of the device T' extracts the autonomous system number ASN(T) associated with the device T and stores it, for example in its non-volatile memory 7, in association with the device T (step F60).

Then it responds to the device T by providing it with (making an advertisement of) the autonomous system number ASN(T') associated therewith (step F70). In the example illustrated in FIG. 5, the autonomous system number ASN (T') is provided to the device T in an advertisement RA message, in a field or option of this message.

Upon receipt of the RA message sent by the device T', the module 3B of the device T extracts the autonomous system number ASN(T') associated with the device T' and stores it, for example in its non-volatile memory 7, in association with the device T' (step F80). This step of receiving the autonomous system number ASN(T') constitutes a discovery of the autonomous system number associated with the device T' within the meaning of the invention.

Once the exchange of the autonomous system numbers between the devices T and T' has ended, a BGP session is automatically established between these two devices, in a manner known per se (step F90). This BGP session can be established either on the initiative of the device T via its establishment module 3C or on the initiative of the device T' via its establishment module 4C, for example by sending a BGP message OPEN as provided by the BGP protocol. Steps F50 and F70 can be carried out in any order.

FIG. 6 illustrates a third embodiment of the invention. In this third embodiment of the invention, only the device T is configured with an autonomous system number ASN(T) =65500 with which it is associated (step G10). This configuration is carried out as in the example of FIG. 4. It is assumed that the device T' is not associated with any autonomous system number (a fortiori, the device T is not configured with an autonomous system number associated with the device T'). It is also assumed here that only the means 3 of the device T are activated and only the means 4 of the device T' are activated.

It is now assumed that a physical connection is established between the device T and the device T', via their respective communication means 10 in an identical manner to what has been described in step E30 in the first embodiment (step G20).

The establishment of the physical connection between the device T and the device T' is detected by the detection module 3A of the device T (step G30).

This triggers an exchange with the device T' initialized here by the module 3B of the device T.

More specifically, during this exchange, the device T, via its module 3B, allocates to the device T' an autonomous system number noted ASN(T'/T) (third autonomous system number within the meaning of the invention) (step G40). This autonomous system number ASN(T'/T) is selected by the module 3B of the device T from a predetermined range of values. This range of values was for example provided thereto during its configuration by the administrator of the network R or by the controller 2 or by another device of the network R depending on the way in which the device T was configured. There is no limitation attached to the way in which the module 3B of the device T selects the autonomous system number ASN(T'/T) from the range of values at its disposal: this may depend for example on the hierarchical level to which the device T' belongs and on policies for allocating autonomous system numbers within the predefined network R, known to the device T, of the cluster to which the device T' belongs when appropriate, etc.

The device T stores in association with the device T' the autonomous system number ASN(T'/T) that its module 3B has just allocated thereto, for example in its non-volatile memory 7.

Then, the module 3B of the device T makes an advertisement to the device T' (step G50) of:
  the autonomous system number ASN(T) associated with the device T; and
  the autonomous system number ASN(T'/T) it has just allocated to the device T'.

In the example illustrated in FIG. 6, this advertisement is made via the sending by the module 3B of the device T (and via the communication means 10 of the device T and the physical connection established with the device T') of a single router advertisement RA message to the device T'. This RA message comprises, in a field or in another option of the message, the autonomous system number ASN(T), and in another field or in another option of the message, the autonomous system number ASN(T'/T). Alternatively, two separate messages can be used.

Upon receipt of the RA message received from the device T, the module 4B of the device T' extracts the autonomous system number ASN(T) associated with the device T and stores it, for example in its non-volatile memory 7, in association with the device T (step G60).

Furthermore, the module 4B of the device T' extracts from the RA message the autonomous system number ASN(T'/T) that the device T has allocated thereto (step G70). Then it determines whether the device T' already has an autonomous system number with which it is associated (G80 test step).

In the example considered here, it is assumed that the device T' does not have an autonomous system number with which it is already associated (response "no" to the G80 test step). The module 4B of the device T' then configures the device T' with the autonomous system number ASN(T'/T) that the device T has allocated thereto (step G90). This configuration consists in storing, for example in the non-volatile memory 7, the autonomous system number ASN(T'/T) allocated by the device T as autonomous system number associated with the device T'. A message of acknowledgment or acceptance of the autonomous system number allocated by the device T is sent here to the device T (step G100).

If, however, the module 4B determines that the device T is already associated with an autonomous system number (response "yes" to G80 test step), for example with a number ASN(T'), the module 4B of the device T' rejects the autonomous system number ASN(T'/T) allocated by device T and makes an advertisement to the device T of the autonomous system number ASN(T') to which the device T' is already attached (fourth autonomous system number within the meaning of the invention). In the example considered in FIG. 6, the rejection of the autonomous system number ASN(T'/T) and the advertisement of the autonomous system number ASN(T') are carried out by the module 4B of the device T' by means of a single RA message sent by the device T' to the device T (step G110).

Upon receipt of the RA message, the module 3B of the device T extracts the autonomous system number ASN(T') associated with the device T' and stores it in its non-volatile memory 7 in association with the device T' in replacement of the autonomous system number ASN(T'/T) (step G120).

Once the exchange of the autonomous system numbers between the devices T and T' has ended, a BGP session is automatically established between these two devices, in a manner known per se (step G130). This BGP session can be established either on the initiative of the device T via its establishment module 3C or on the initiative of the device T' via its establishment module 4C, for example by sending a BGP message OPEN as provided by the BGP protocol.

It is noted that in the different embodiments described with reference to FIGS. 4, 5 and 6, the advertisements of the autonomous system numbers ASN(T) and when appropriate ASN(T'/T), were carried out by the device T' by means of an RA message or an RS message. Alternatively, other messages can be used, such as for example messages created specifically for this purpose, or via a BGP session establishment message OPEN such as the one already defined in the BGP protocol, with the addition of fields appropriate in this message.

In addition, in the embodiments described above, the establishment of a single BGP session between the devices T and T' has been considered. The invention also applies in a multi-instance BGP context. More particularly, the invention also allows the automatic establishment of multiple BGP sessions in parallel, whether these sessions use the same AS numbers or use different AS numbers. If different AS numbers are used to establish BGP sessions in parallel, the exchange step implemented according to the invention between the devices T and T' then comprises, in the same manner as what has been previously described for a single AS number, the exchange (including the advertisement, the discovery or the allocation) of the different AS numbers necessary for the establishment of these parallel BGP sessions.

Figure 7A:
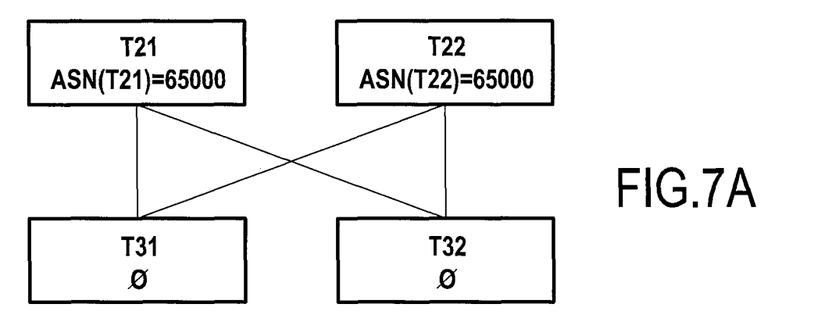
FIGS. 7 and 8 illustrate examples of application of the invention.
Figure 7B:
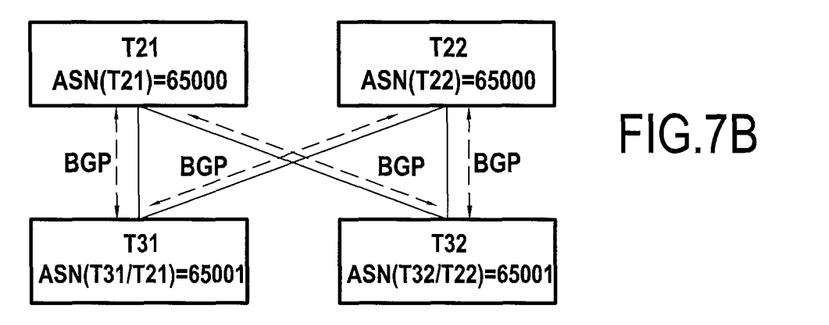
Figure 8:
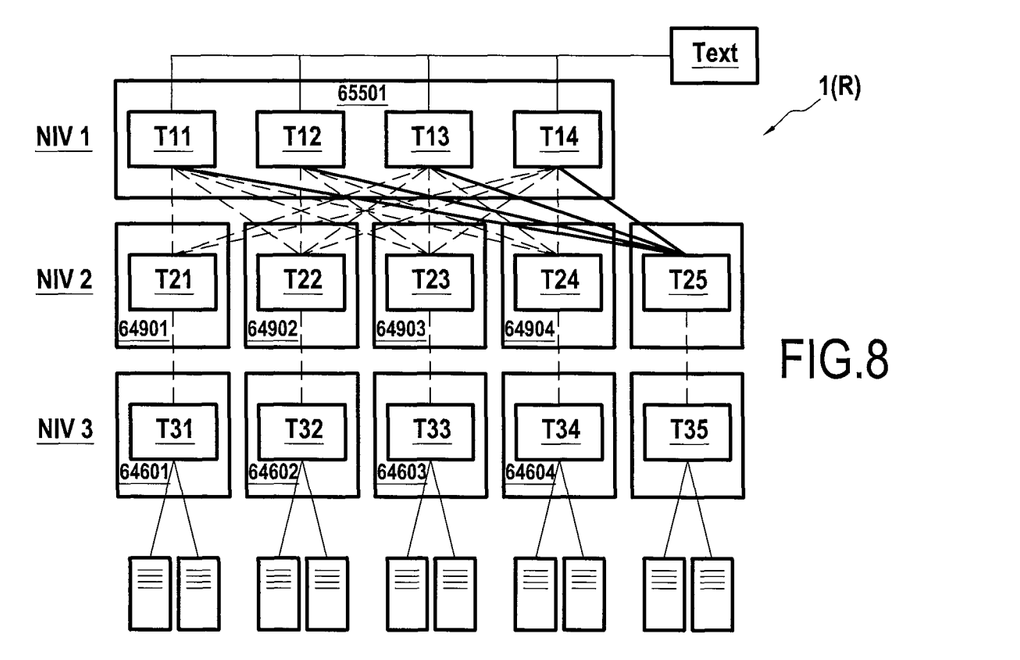

FIGS. 7 and 8 illustrate two examples of application of the invention.

More specifically, FIG. 7 illustrates a first example of application in which a network comprising four network devices is considered, namely the devices T21 and T22 which belong to a first hierarchical level, and the network devices T31 and T32 which belong to a second hierarchical level.

It is assumed that the devices T21 and T22 are each configured beforehand with the same autonomous system number ASN(T21)=65000 and ASN(T22)=65000 which is associated therewith. The device T21 is also configured with a range of values in which it can select values of autonomous system numbers to allocate to its neighboring devices. On the other hand, it is assumed that the devices T31 and T32 are not associated with any autonomous system number.

It is now assumed that the devices T31 and T32 are physically connected to the devices T21 and T22, and that their interfaces of connection to this physical connection are identified by their local link addresses.

Upon detection of a physical connection established with the device T31, respectively with the device T32, the device T21 allocates an autonomous system number ASN(T31/T21)=65001 to the device T31, respectively ASN(T32/T21)=65002 to the device T32.

Then it makes an advertisement via an RA message sent to the device T31, respectively to the device T32, of its autonomous system number ASN(T21) and the autonomous system number ASN(T31/T21), respectively ASN(T32/T21), it has just allocated thereto.

Upon receipt of the RA message, the device T31, respectively the device T32, is configured with the autonomous system number ASN(T31/T21), respectively ASN(T32/T21) allocated by the device T21.

A BGP session is then established between the device T21 and the device T31, respectively between the device T21 and the device T32, by using the exchanged autonomous system numbers.

In addition, the device T31, respectively the device T32, makes an advertisement, by means of an RA message, of its autonomous system number ASN(T31/T21), respectively ASN(T32/T21) to the device T22, and vice versa. A BGP session is then established between the device T22 and the device T31, respectively between the device T22 and the device T32, by using the exchanged autonomous system numbers.

At the end of this procedure, the configuration of the network is as illustrated in FIG. 7B.

FIG. 8 illustrates a second example of application of the invention in which the addition of two devices T25 and T35 is considered in the network represented in FIG. 1 (for the sake of simplification the controller 2 is not represented in the figure). It is assumed that the AS numbers allocated to the other devices of the network R via the implementation of the invention are those represented in FIG. 8, namely:

65601 for the devices T11, T12, T13 and T14 belonging to the first hierarchical level;

64901 for the device T21, 64902 for the device T22, 64903 for the device T23 and 64904 for the device T24 belonging to the second hierarchical level; and 64601 for the device T31, 64602 for the device T32, 64603 for the device T33 and 64604 for the device T34 belonging to the third hierarchical level.

The newly added devices T25 and T35 do not have the information necessary to establish BGP sessions with their neighbors, and therefore particularly the autonomous system numbers of their neighbors or their own autonomous system numbers to which they are attached. It is assumed that each of the devices of the network (including the two devices T25 and T35) comply with the invention, and that the device T25 is connected via a physical connection to the devices T11, T12, T13 and T14, and the device T35 is connected via a physical connection to the device T25.

When the link T11-T25 is activated, a control RA message is emitted by the network device T11 to the device T25 comprising in particular:

the autonomous system number of the device T11 (65601);

an autonomous system number to be used by the device T25 and that the device T11 has allocated thereto, for example 64905;

a cluster size of the lower hierarchical level (e.g. size=1); and a range of values for the allocation of autonomous system numbers to its neighbors belonging to a lower hierarchical level, for example [64601-64899].

Upon receipt of this RA message, the network device T25 extracts the above-mentioned elements contained in the message and is configured therewith.

Then a BGP session is automatically established between the network devices T11 and T25, on the initiative of the network device T11 or of the network device T25 from the autonomous system numbers exchanged and associated respectively with the devices T11 and T25.

If links with the other network devices of the hierarchical level NIV1 are activated (for example, here with the devices T11, T12, T13 and T14), then the network device T25 can in turn make an advertisement of its autonomous system number and discover the one of its neighbors, via RA and RS messages as described above with reference to FIGS. 4 to 6. BGP sessions are then established automatically with these network devices.

Concomitantly with these exchanges, the network device T25 allocates, among the range of values communicated thereto by the network device T11, an autonomous system number to the network device T35 of the hierarchical level NIV3 to which it is connected and transmits it with its own autonomous system number in a received RA message to the device T35. Following this message, a BGP session is automatically established between the network devices T25 and T35.

The new extension of the network R then becomes operational (i.e. the new devices of this network T25 and T35 have the necessary BGP routing information and are visible by the other devices of higher level).

It is noted that the procedure for automatically configuring the network R can be initialized from any device of the network R, and in particular from any hierarchical level. If a device of the network receives several proposals of instructions for configuring several neighbors due to the near-to-near propagation, it must choose a proposal from those it has received and inform its neighbors, as indicated above with reference to FIG. 6.

The invention has been described here in the context of a network of a data center. Although having a privileged application in this context, the invention can be applied to any type of network using a dynamic routing protocol, and whatever the adopted policy of allocating the autonomous system numbers in this network.

In addition, the invention has been described here with reference to the dynamic routing protocol BGP. However, it can also be applied to other routing protocols using autonomous system numbers, such as for example the routing protocol TRIP defined in document IETF RFC 3219. The routing protocol TRIP, in addition to the autonomous system numbers, further uses another identifier called IP Telephony Administrative Domain also under the designation ITAD which can be exchanged between the network devices in the same manner as what has just been described for the autonomous system numbers.

The invention claimed is:

1. A method comprising:

automatically establishing, by a first network device, a session complying with a dynamic routing protocol with a second network device, the first device being associated with a first autonomous system number and not knowing any autonomous system number associated with the second device, said automatically establishing comprising, in response to detection by the first device of existence of a connectivity with the second device:

exchanging with the second device comprising advertising to the second device the first autonomous system number, said exchanging further comprising:

allocating to the second device an autonomous system number, called second autonomous system number and advertising to the second device the second autonomous system number that has been allocated thereto, wherein the second autonomous system number allocated by the first device to the second device is selected by the first device from a predetermined range of values; and establishing with the second device the session according to said routing protocol by using the autonomous system numbers exchanged during the exchanging between the first device and the second device.

2. The method according to claim 1, wherein the exchanging further comprises, following the allocation of the second autonomous system number to the second device:

receiving a response from the second device refusing the second autonomous system number that has been allocated thereto by the first device and comprising a third autonomous system number with which the second device is already associated; and storing the third autonomous system number in association with the second device in replacement of the second autonomous system number.

3. The method according to claim 1 further comprising sending by the first device to the second device a range of autonomous system numbers from which the second device can draw to allocate an autonomous system number to at least a third device.

4. The method according to claim 1 wherein the session is established during the establishing on an initiative of the first device.

5. The method according to claim 1 wherein the session is established during the establishing on an initiative of the second device.

6. The method according to claim 1 wherein the automatic routing protocol is the BGP (Border Gateway Protocol) or the TRIP (Telephony Routing over IP) protocol.

7. The method according to claim 6, wherein, the routing protocol is the BGP protocol, and the advertising of the first and/or of the second autonomous system number is carried out by using router advertisement messages and/or router solicitation messages.

8. The method according to claim 6 wherein, the routing protocol is the BGP protocol, and the advertising to the second device of the first and/or of the second autonomous system number is carried out by using a BGP session establishment message OPEN sent by the first device to the second device.

9. The method according to claim 6 wherein, the routing protocol is the TRIP protocol, and the exchanging further comprises:
 advertising a first IP Telephony Administrative Domain identifier associated with the first device; and
 discovering a second IP Telephony Administrative Domain identifier associated with the second device, or allocation and exchange of a third IP Telephony Administrative Domain identifier to the second device.

10. A non-transitory computer-readable medium comprising a computer program recorded thereon, the computer program comprising including instructions for executing a method for automatically establishing, by a first network device, a session complying with a dynamic routing protocol with a second network device, when said program is executed by a processor of the first device, wherein the instructions configure the first device to,
 in response to detection by the first device of existence of a connectivity with the second device, the first device being associated with a first autonomous system number and not knowing any autonomous system number associated with the second device:
 exchange with the second device comprising advertising to the second device the first autonomous system number, said exchange further comprising:
  allocating to the second device an autonomous system number, called second autonomous system number and advertising to the second device the second autonomous system number that has been allocated thereto, wherein the second autonomous system number allocated by the first device to the second device is selected by the first device from a predetermined range of values; and
 establish with the second device the session according to said routing protocol by using the autonomous system numbers exchanged during the exchange between the first device and the second device.

11. A network device, called first device, configured to automatically establish a session complying with a dynamic routing protocol with a second network device, said first device comprising:

a processor; and a non-transitory computer-readable medium comprising instructions stored thereon, which when executed by the processor configure the first device to, in response to detection by the first device of existence of a connectivity with the second device, the first device being associated with a first autonomous system number and not knowing any autonomous system number associated with the second device:
 exchange with the second device, comprising:
  advertising to the second device of the first autonomous system number;
  allocating to the second device an autonomous system number, called second autonomous system number, wherein the second autonomous system number allocated by the first device to the second device is selected by the first device from a predetermined range of values, and
  advertising to the second device the second autonomous system number that has been allocated thereto; and
 establish with the second device the session according to said routing protocol by using the autonomous system numbers exchanged between the first device and the second device.

12. A method comprising:

automatically establishing, by a first network device, a session complying with a dynamic routing protocol with a second network device, the first device being associated with a first autonomous system number and not knowing any autonomous system number associated with the second device, said automatically establishing comprising, in response to detection by the first device of existence of a connectivity with the second device:

exchanging with the second device comprising advertising to the second device the first autonomous system number, said exchanging further comprising:
 discovering an autonomous system number, called second autonomous system number, with which the second device is associated, wherein the discovering of the second autonomous system number comprises:
  sending a discovery message to the second device inviting the second device to provide the second autonomous system number; and
  receiving the second autonomous system number from the second device in response to the discovery message; and establishing with the second device the session according to said routing protocol by using the autonomous system numbers exchanged during the exchanging between the first and the second device.

* * * * *